March 7, 1967  J. A. WIEBELT  3,307,783

THERMOSTATIC SURFACE

Filed March 4, 1964  2 Sheets-Sheet 1

INVENTOR.
JOHN A. WIEBELT
BY
Head & Johnson
ATTORNEYS

March 7, 1967 J. A. WIEBELT 3,307,783
THERMOSTATIC SURFACE
Filed March 4, 1964 2 Sheets-Sheet 2

INVENTOR.
JOHN A. WIEBELT
BY
*Head & Johnson*
ATTORNEYS

United States Patent Office 3,307,783
Patented Mar. 7, 1967

3,307,783
THERMOSTATIC SURFACE
John A. Wiebelt, Stillwater, Okla., granted to National Aeronautics and Space Administration under the provisions of 42 U.S.C. 2457(d)
Filed Mar. 4, 1964, Ser. No. 349,368
5 Claims. (Cl. 236—1)

This invention relates to a thermostatic surface. More particularly, the invention relates to a surface having the characteristic of self-thermostatic adjustment according to the temperature thereof to maintain a substantially constant temperature when subjected to varying amounts of internally generated heat and externally received radiant energy. Still more particularly, the invention relates to a thermostatic surface particularly adapted for spacecraft having the characteristic of being temperature self-adjusting to maintain substantially a preselected skin temperature during changes of temperature of the skin arising from internal heat generated in the spacecraft and the absorption of externally received radiant energy.

This invention will be described as it is adapted for use for spacecraft, it being understood that such example is not intended as a limitation and that the principals of this invention have other application.

The surface temperature of a space vehicle is determined by a heat balance between the surface and its environment. When the vehicle is an earth satellite the heat balance includes the following energy sources:

(1) Energy received from the sun, that is solar radiation;
(2) Energy received from the earth, that is terrestrial radiation;
(3) Albedo radiation, that is solar radiation reflected and scattered by the earth and its atmosphere;
(4) Radiant energy received from other bodies in space, that is galactic radiation;
(5) Aerodynamic heat (negligible above 200 miles altitude);
(6) Internally generated heat, that is heat eminated by electronic equipment, human beings, etc.;

While some of the factors affecting surface temperature of space vehicles can be computed accurately and in advance of the vehicle launch, others cannot. For this reason it is important to provide a method for use with the spacecraft wherein the energy gain or loss to the surroundings is self-controllable.

It is therefore an object of this invention to provide a thermostatic skin for spacecraft.

Another object of this invention is to provide a skin for spacecrafts or the like wherein the energy absorbed relative to the energy emitted is automatically compensated to maintain a substantially uniform skin temperature.

Another and a particular object of one embodiment of this invention is to provide a thermostatic skin for spacecraft wherein the base of the skin is provided with a diffusing surface and including means whereby as the temperature of the skin decreases greater portions of the diffusing base skin are shielded to retard energy radiated by the spacecraft.

These and other objects may be understood and a better understanding of the invention had by referring to the description and claims taken in conjunction with the attached drawings in which:

Figure 1:
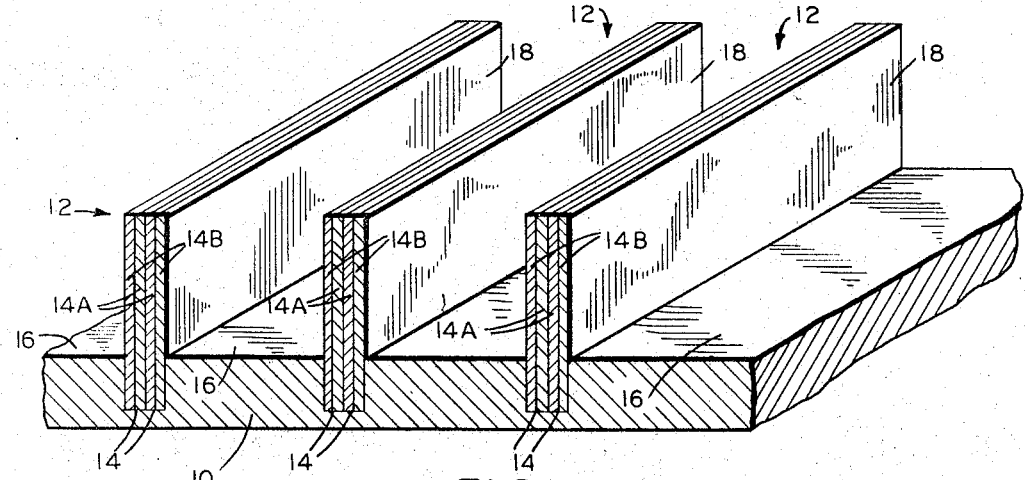
FIGURE 1 is an isometric view of a portion of a thermostat skin for spacecraft surface according to this invention showing the appearance of the skin of the spacecraft as it would appear at a preselected maximum skin temperature.

This invention may be described as a thermostatic skin for spacecraft or the like. More particularly, but not by way of limitation, the invention may be described as a thermostatic skin for a spacecraft or the like comprising a base skin having a multiplicity of paralleled rows of thermostatic bimetallic strips, each of said strips having the lower edge thereof affixed to said base skin.

In space environment a spacecraft system gains or loses energy entirely by radiant exchange with the environment. The parameter which is most important for a system which must radiate energy away is the ratio $Q/PT_s^4$ where Q is the energy radiated away from the surface per unit area, B.t.u./hr.-ft.²; $PT_s^4$ is the Plankian radiation from a black surface which has a temperature, $T_s$. This ratio is given the symbol $e_r$, that is, $e_r = Q/PT_s^4$. As can be seen from this definition, when $e_r$ has a positive value, energy is radiated away from the spacecraft, or the spacecraft is experiencing a net energy loss to space from that portion of the surface for which $e_r$ (a point function) is positive. When $e_r$ is negative the surface element under consideration has a net energy gain from the space environment.

Since all spacecraft will be dissipating heat from internal parts (electronic equipment, men, etc.) the usual requirement for $e_r$ will be a positive value. However, if the spacecraft is shaded from solar input, the value of $e_r$ must not change radically. In order for a surface to meet these criteria, the surface must change the average value of $e_r$ within specified limits. The value of $e_r$ is a function of three variables for the surface element: E, the emittance at the temperature of the surface; $AB_s$, the solar absorptance; and $T_s$, the surface temperature. The value of $e_r$ is:

$$e_r = E - AB_s \frac{G_s}{PT_s^4}$$

where $G_s$ is the solar irradiation.

The fourth variable in the equation, $G_s$, is dependent upon the surface element orientation or shading by other elements. With complex trajectories and the complex geometry of spacecraft, $G_s$ is a very difficult quantity to predict (note this must include reflections from other portions of the spacecraft). For this reason, reliable simple control of $e_r$ must depend on varying E and $AB_s$ for the surface.

Control of E and $AB_s$ for individual points on the surface would require a local surface with variable characteristics. Such a surface would have the characteristic of a paint or coating which changed "color" with temperature change. The control of $e_r$ averaged over the entire surface would effectively accomplish the same result if sufficient internal mass is present to distribute the resulting temperature variations.

The average value of $e_r$ will depend on the average value of E and $AB_s$ for the surface. For a surface area A if $A_1$ be a portion of the area associated with E, and $AB_s$, and $A_2$ be a portion of the surface area associated with $E_2$ and $AB_{s2}$, and if the areas $A_1$ and $A_2$ can be controlled by means of a thermostatic material, the average values of E and $AB_s$ can be controlled. The method used to control areas according to one embodiment of this invention is shown in FIGURE 1.

In FIGURE 1 the spacecraft base skin is indicated by the numeral 10. Supported to the base skin 10 are a multiplicity of parallel rows of thermostatic elements, each row being identified by the numeral 12. Each of the rows 12 is made up of two contiguous bimetallic strips 14. Each of the bimetallic strips 14 is in turn composed of two metals of dissimilar expansion characteristics, the elements being identified as 14A, the low expansion element, and 14B the high expansion element.

The base skin 10 is provided with an exterior diffuse surface 16. This surface may be of any type having a diffused characteristic, such as white paint. Each of the exterior surfaces of the high expansion element 14b of each bimetallic strip 14 is provided with a specular surface of high reflectance 18. The exterior surface of the low expansion element 14A of each of the thermostatic strips 14 is provided with a low terrestrial emittance coating 20, not seen in FIGURE 1 but disclosed in FIGURE 2.

Figure 2:
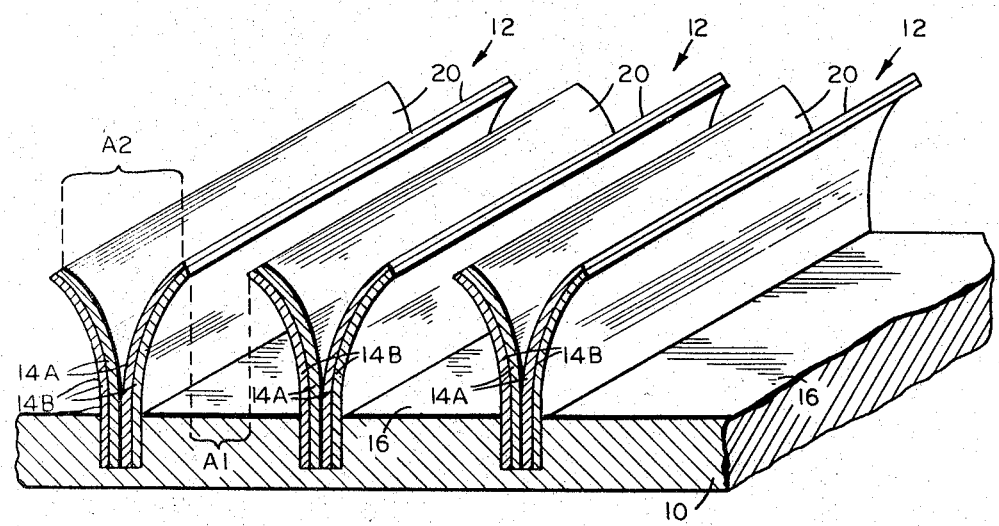
FIGURE 2 is an isometric view of the same portion of a spacecraft skin as shown in FIGURE 1 showing the appearance of the skin as the temperature decreases.

With the diffuse base surface 16 of a coating such as white paint, analysis indicates that 37.5 B.t.u. per hour per square foot would be radiated away from the surface when the surface faced the sun, assuming the spacecraft is in an orbit of approximately 200 miles from the earth. As the temperature decreases, the bimetallic strip 14 in each row 12 warps inward or tends to shade the base material as shown in FIGURE 2. This is accomplished by mounting each bimetallic strip 14 of each row 12 with the low expansion sides 14A adjacent, as previously mentioned. When the temperature increases, the fins tend to assume the vertical position as shown in FIGURE 1, so that less shading of the base occurs.

The basic action of the thermostatic surface is best described with reference to FIGURE 2. When the strips are warped open as is shown in FIGURE 2, two areas may be said to be described, that is, $A_1$, the area between fins not shaded by the strips, and $A_2$, the area between adjacent strip elements. These two areas have apparent emittance and reflectance values which differ considerably. Area $A_1$ will have an apparent solar absorbance $AB_{s1}$ which is very much lower than the solar absorbance $AB_{s2}$ or area $A_2$. This is because the slit formed by the bimetallic strips has a small angle and therefore will be, as far as absorbance is concerned, nearly black. Similarly, the emittance of the two areas will be different, although the emittance variation is not as large as the solar absorbance variation. As the bimetallic strips 14 cool to a temperature significantly different the slit angle between the adjacent strips in any row becomes larger. Since the area $A_2$ has a higher solar absorbance than the reduced area $A_1$, the total absorbance of the spacecraft skin increases, raising the temperature thereof. As the temperature of the skin increases the higher expansion elements 14B expand faster than the lower expansion elements 14A of each bimetallic strip 14 tending to straighten the bimetallic strips back into juxtaposed position as shown in FIGURE 1. In this way it can be seen that by variation of both the solar absorbance and emittance of the two areas $A_1$ and $A_2$ the temperature of the spacecraft skin is self compensating.

Figure 3:
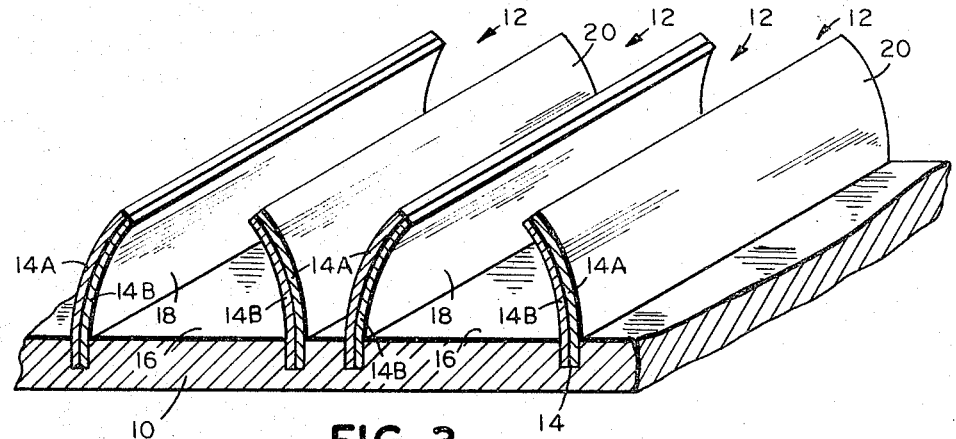
FIGURE 3 is an isometric view of a portion of a spacecraft skin showing an alternate embodiment of the invention.

FIGURE 3 shows an alternate embodiment wherein each row is made up of a single bimetallic element. The method of FIGURE 3 functions substantially as described with reference to FIGURES 1 and 2. As the temperature of the skin 10 decreases the bimetallic strips warp to increase the total solar absorbance of the skin and as the temperature rises the bimetallic elements move to decrease the solar absorbance.

Figure 4:
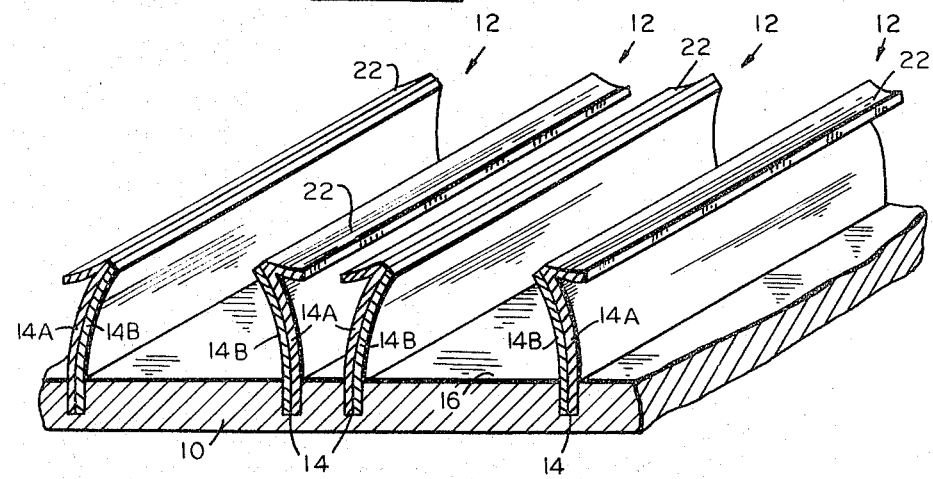
FIGURE 4 is likewise an isometric view of a portion of a spacecraft skin according to this invention showing another alternate embodiment.

FIGURE 4 shows an alternate embodiment of FIGURE 3 including the provision of integrally formed lip portions 22 extending to more completely shade the areas between adjacent rows.

Figure 5:
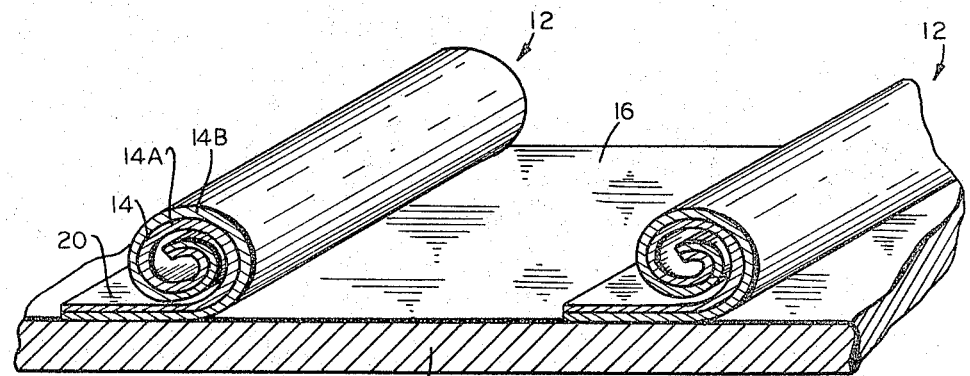
FIGURE 5 is still another isometric view of a portion of a spacecraft skin according to this invention showing still another alternate embodiment.

FIGURE 5 shows still another alternate embodiment of the invention. In this embodiment the base skin 10 is provided with an exterior diffuse surface 16 in the same manner described with reference to FIGURE 1. In this embodiment each row of thermostatic material 12 consists of a coil of a bimetallic strip 14. The strip being affixed at one end thereof to the base skin 10. The high expansion element 14B being affixed to the base skin 10 and forming the exterior of the coiled bimetallic element 12. As the temperature of the skin 10 drops the coiled bimetallic element 14 tends to unroll shading a greater portion of the area between the row 12. The surface of the lower expansion element 14A is a low emittance surface 20 so that as the bimetallic strip 14 uncoils the total solar absorbance of the skin is increased. In this way the temperature of the skin increases and as it increases thermostatic element 14 will begin to coil, exposing a greater portion of the diffuse surface 16.

The basic embodiment of FIGURES 1 and 2 and the alternate embodiment of FIGURES 3, 4, and 5 are exemplary only as it can be seen that many variations and modifications of the invention may be made without departing from the spirit and the scope of the invention.

What is claimed:
1. A thermostatic surface comprising:
   an imperforate base skin having an exterior diffused surface; and
   a multiplicity of paralleled rows of thermostatic bimetallic strips, each of said strips having one edge thereof affixed to said base skin, said bi-metallic strips having specular surfaces, said bi-metallic strips warping to shade increased areas of said base skin as the temperature thereof decreases.

2. A thermostatic surface according to claim 1 wherein said bimetallic strips are arranged in juxtaposed pairs which warp in opposite directions to shade increased areas of said base skin as the temperature increases.

3. A thermostatic surface comprising:
   an imperforate base skin having an exterior specular surface; and
   a multiplicity of paralleled rows of thermostatic bimetallic strips, each of said strips having one edge thereof affixed to said base skin, said bimetallic strips having diffused surfaces, said bimetallic strips warping to shade increased areas of said base skin as the temperature thereof increases.

4. A thermostatic surface according to claim 1 wherein each of said bi-metallic strips has a lip portion extending from the upper surface thereof, said lip portion extending substantially parallel the said base skin.

5. A thermostatic surface according to claim 1 wherein each of said parallel rows of bi-metallic strips is in the form of a longitudinally extending coil.

References Cited by the Examiner

UNITED STATES PATENTS

| | | | |
|---|---|---|---|
| 1,459,318 | 6/1923 | Birdsall | 236—35.2 |
| 2,437,287 | 3/1948 | Woods | 236—35.2 |
| 2,580,149 | 12/1951 | Woods | 236—35.2 |

FOREIGN PATENTS

| | | |
|---|---|---|
| 142,945 | 8/1951 | Australia. |

EWARD J. MICHAEL, *Primary Examiner.*